No. 779,243. PATENTED JAN. 3, 1905.
W. SMITH.
HORSE EXERCISING APPARATUS.
APPLICATION FILED AUG. 10, 1904.
2 SHEETS—SHEET 1.
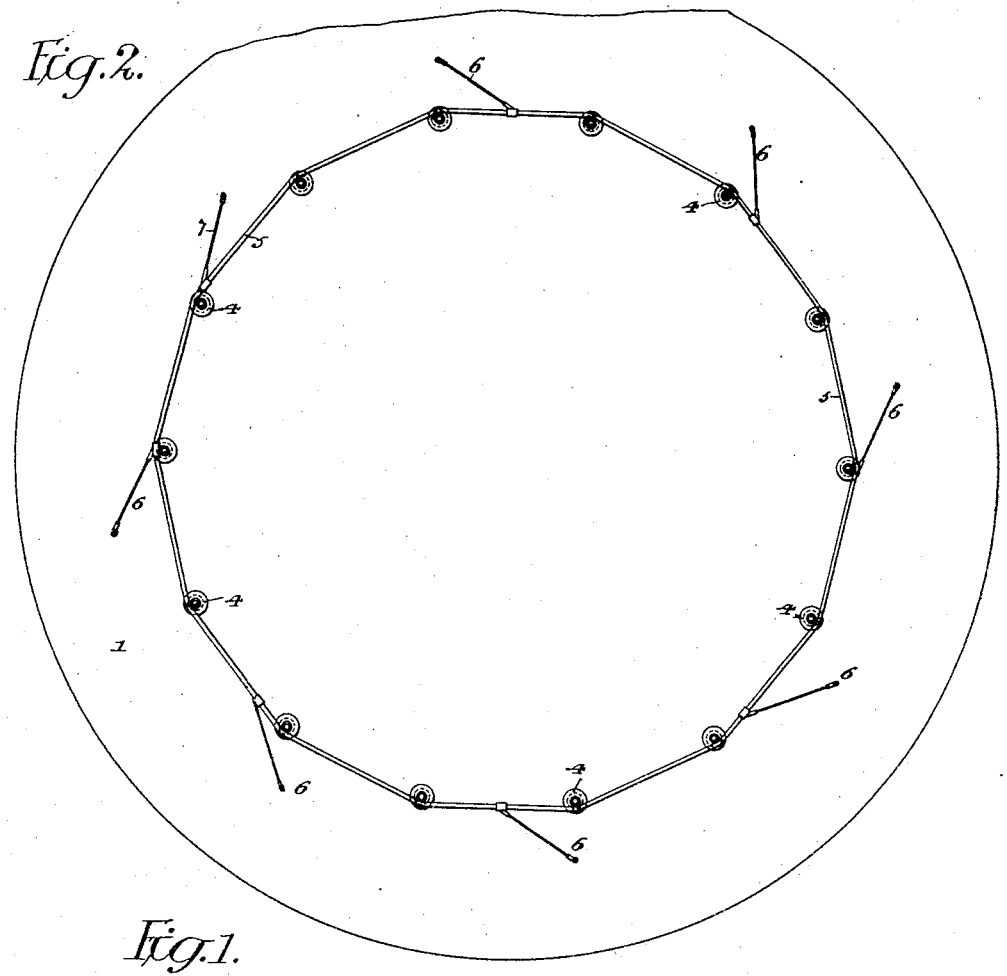
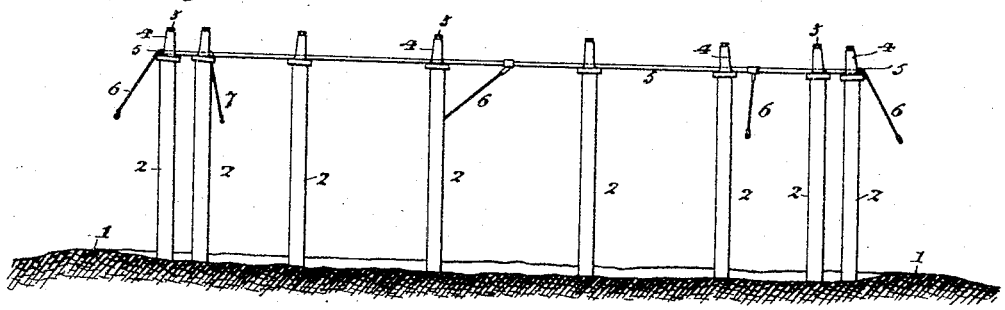

No. 779,243. PATENTED JAN. 3, 1905.
W. SMITH.
HORSE EXERCISING APPARATUS.
APPLICATION FILED AUG. 10, 1904.

2 SHEETS—SHEET 2.

Witnesses
Louis H. Buck.
Wisley H. Reel.

Inventor
William Smith
by his attorneys
Howson & Howson

No. 779,243. Patented January 3, 1905.

UNITED STATES PATENT OFFICE.

WILLIAM SMITH, OF PHILADELPHIA, PENNSYLVANIA, ASSIGNOR TO WILLIAM DISSTON, OF PHILADELPHIA, PENNSYLVANIA.

HORSE-EXERCISING APPARATUS.

SPECIFICATION forming part of Letters Patent No. 779,243, dated January 3, 1905.

Application filed August 10, 1904. Serial No. 220,281.

*To all whom it may concern:*

Be it known that I, WILLIAM SMITH, a citizen of the United States, residing in Philadelphia, Pennsylvania, have invented certain Improvements in Horse-Exercising Apparatus, of which the following is a specification.

My invention consists of a horse-exercising apparatus intended especially for cooling off a number of horses after a race or after they have been speeded for trying-out purposes, the object of the invention being to effect the desired control of a number of horses while they are being thus exercised without the necessity of providing each horse with a separate rider.

Figure 3:
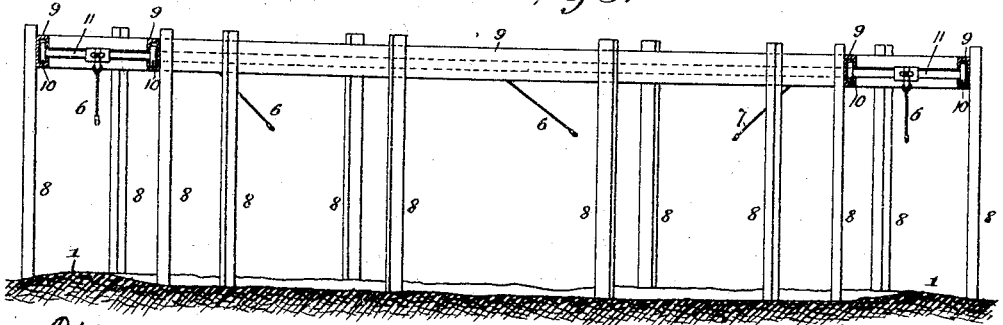

In the accompanying drawings, Figure 1 is a vertical sectional view of one form of horse-exercising device constructed in accordance with my invention. Fig. 2 is a plan view of the same. Fig. 3 is a sectional view of another form of apparatus embodying the invention, and Fig. 4 is a plan view of the apparatus shown in Fig. 3.

Referring first to Figs. 1 and 2 of the drawings, 1 represents the exercising-track, which may be circular, oval, or of any other desired shape and of any required dimensions. Around the inside of this track are erected a number of poles 2, and at the top of each of these poles is a projecting shaft or axle 3, upon which is free to turn a flanged sheave or pulley 4, the latter supporting an endless rope or band 5, which thus extends completely around the track. Secured to this rope or band 5 at appropriate intervals are a series of hitching straps, ropes, or other connections 6 and a towing strap, rope, or other connection 7, so that by attaching a driven horse to this towing-strap the rope or band 5 may be caused to travel, and any desired number of horses connected to the hitching-straps 6 can thus be led around the ring at any required speed, the only attendant required being the one who rides or drives the horse which furnishes the motive power for the rope or band 5, or, instead of using a horse for this purpose a motor-vehicle propelled by any suitable power may be employed. The hitching-straps should be of such length that the led horses cannot run up on each other, the limited range of action thus permitted each led horse also preventing him from leaving the track.

Figure 4:
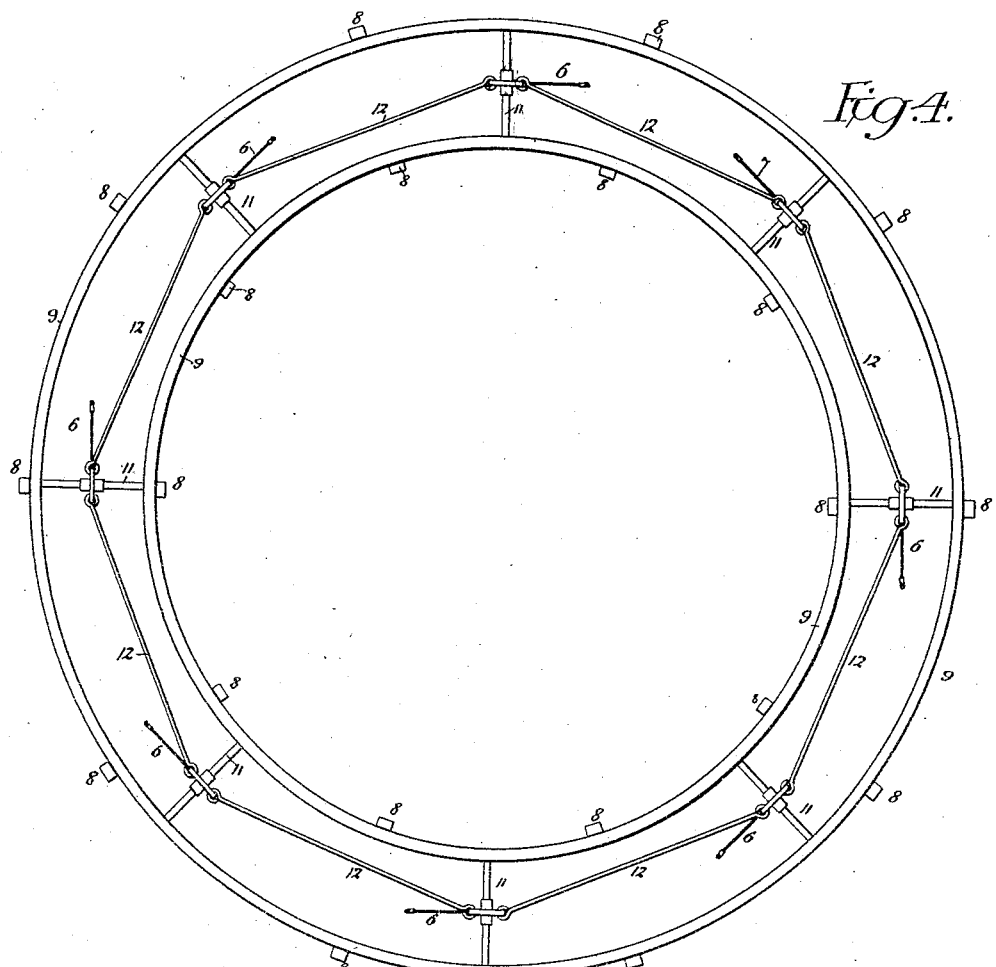

In Figs. 3 and 4 I have illustrated another embodiment of my invention, in which posts 8 are erected both on the inside and on the outside of the track, these posts carrying grooved rails 9, to which are adapted pulleys 10 upon the opposite ends of rods 11, to which the hitching and draft straps are secured, these transverse rods 11 being separated from each other by longitudinal rods 12, so as to maintain them at the proper distance apart and prevent the horses from running up on each other. In this case also a mechanical motor, running either upon the track or upon the rails 9, may be used instead of a driven horse as the motive power.

Having thus described my invention, I claim and desire to secure by Letters Patent—

1. The combination of an exercising-track with a rotatable device extending around the same, and provided with hitching connections for a number of horses, substantially as specified.

2. The combination of an exercising-track, with a series of posts extending around the same, and carrying a rotatable device provided with hitching connections for a number of horses, substantially as specified.

3. The combination of an exercising-track, with a series of posts extending around the same, and carrying a rotatable device provided with hitching connections for a number of horses, and also with means whereby it may be connected to a moving body which will impart rotary motion to said device, substantially as specified.

4. The combination of an exercising-track with posts around the inside and outside of the track, rails on each of said posts, and a rotatable device mounted on said rails and having hitching connections for a number of horses, substantially as specified.

5. The combination of an exercising-track with posts around the inside and outside of the track, rails on each of said posts, and a rotatable device mounted on said rails, and having hitching connections for a number of horses, and also provided with means whereby it may be connected to a moving body which will impart rotary motion to said device, substantially as specified.

6. The combination of the exercising-track, the inner and outer rows of posts around the same, rails on said posts, pulleys running on said rails, a transverse rod connecting each pair of pulleys, and longitudinal rods connecting said transverse rods, substantially as specified.

In testimony whereof I have signed my name to this specification in the presence of two subscribing witnesses.

WILLIAM SMITH.

Witnesses:
WALTER CHISM,
JOS. H. KLEIN.